US008200027B2

(12) United States Patent
Bouguet et al.

(10) Patent No.: US 8,200,027 B2
(45) Date of Patent: *Jun. 12, 2012

(54) METHODS AND APPARATUS FOR RETRIEVING IMAGES FROM A LARGE COLLECTION OF IMAGES

(75) Inventors: Jean-Yves Bouguet, Belmont, CA (US); Carole Dulong, Saratoga, CA (US); Igor V. Kozintsev, San Jose, CA (US); Yi Wu, San Jose, CA (US); Ara V. Nefian, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/952,923

(22) Filed: Nov. 23, 2010

(65) Prior Publication Data

US 2011/0081090 A1 Apr. 7, 2011

Related U.S. Application Data

(63) Continuation of application No. 11/604,114, filed on Nov. 22, 2006, now Pat. No. 7,840,076.

(51) Int. Cl.
*G06K 9/62* (2006.01)

(52) U.S. Cl. ...................................... 382/224

(58) Field of Classification Search .................... 382/224
See application file for complete search history.

(56) References Cited

U.S. PATENT DOCUMENTS

| | | | |
|---|---|---|---|
| 5,579,471 A | 11/1996 | Barber et al. | |
| 6,285,995 B1 | 9/2001 | Abdel-Mottaleb et al. | |
| 6,504,571 B1 | 1/2003 | Narayanaswami et al. | |
| 6,801,661 B1 | 10/2004 | Sotak et al. | |
| 6,901,411 B2 | 5/2005 | Li et al. | |
| 6,947,930 B2 | 9/2005 | Anick et al. | |
| 7,840,076 B2 | 11/2010 | Bouguet et al. | |
| 2004/0267740 A1 | 12/2004 | Liu et al. | |
| 2005/0010605 A1 | 1/2005 | Conrad et al. | |
| 2005/0055344 A1 | 3/2005 | Liu et al. | |
| 2005/0120006 A1 | 6/2005 | Nye | |
| 2005/0144162 A1 | 6/2005 | Liang | |
| 2008/0052262 A1 | 2/2008 | Kosinov et al. | |

OTHER PUBLICATIONS

Ke et al., "An efficient parts-based near-duplicate and sub-image retrieval system", Proceedings of the 12th annual ACM international conference on Multimedia, Oct. 10-16, 2004, pp. 869-876.

(Continued)

*Primary Examiner* — David Zarka
(74) *Attorney, Agent, or Firm* — Barre Law Firm, PLLC

(57) ABSTRACT

An image retrieval program (IRP) may be used to query a collection of digital images. The IRP may include a mining module to use local and global feature descriptors to automatically rank the digital images in the collection with respect to similarity to a user-selected positive example. Each local feature descriptor may represent a portion of an image based on a division of that image into multiple portions. Each global feature descriptor may represent an image as a whole. A user interface module of the IRP may receive input that identifies an image as the positive example. The user interface module may also present images from the collection in a user interface in a ranked order with respect to similarity to the positive example, based on results of the mining module. Query concepts may be saved and reused. Other embodiments are described and claimed.

18 Claims, 4 Drawing Sheets

OTHER PUBLICATIONS

Wang et al., "Simplicity: Semantics-sensitive Integrated Matching for Picture Libraries", IEEE Transactions on Pattern Analysis and Machine Intelligence, vol. 23, No. 9, Sep. 2001, pp. 947-963.

Wu et al., "Optimal multimodal fusion for multimedia data analysis", Proceedings of the 12th annual ACM international conference on Multimedia, Oct. 10-16, 2004, pp. 572-579.

Sivic et al., "Efficient object retrieval from videos", Proceedings of the 12th European Signal Processing Conference, Vienna, Austria, 2004, 4 pages.

Carson et al., "Blobworld: Image Segmentation Using Expectation-Maximization and Its Application to Image Querying", IEEE transactions on pattern analysis and machine intelligence, vol. 24, No. 8, Aug. 2002, pp. 1026-1038.

Intelligent Information Management Department IBM T. J.Watson Research Center, "Marvel: Mpeg-7 multimedia search engine", Jul. 21, 2006.

Müller et al., "Performance Evaluation in Content-Based Image Retrieval: Overview and Proposals", Technical Report, Dec. 1, 1999, No. 99.05, 12 pages.

Bradshaw—Tversky, "Introduction to Tversky similarity measure", Psychological Review 84(4), 1977.

Vinay et al., "Comparing Relevance Feedback Algorithms for Web Search", Proceedings of the World Wide Web Conference, May 10-14, 2005, pp. 1052-1053.

Crucianu et al., "Relevance Feedback for Image Retrieval: a short survey", Report of the DELOS2 European Network of Excellence (FP6), Oct. 10, 2004, pp. 1-21.

Zhou et al., "Relevance Feedback in Image Retrieval: A Comprehensive Review", Multimedia Systems, vol. 8, No. 6, 2003, pp. 536-544.

Tong et al., "Support Vector Machine Active Learning for Image Retrieval", Proceedings of the ninth ACM international conference on Multimedia, Sep. 30-Oct. 5, 2001, pp. 107-118.

Rui et al., "Image Retrieval: Current Techniques, Promising Directions, and Open Issues", Journal of Visual Communication and Image Representation Apr. 10, 1999, pp. 39-62.

Tamura et al., "Image database systems: A survey", Pattern Recognition, vol. 17, Issue 1, 1984, pp. 29-43.

Veltkamp et al., "Content-Based Image Retrieval Systems: A Survey", Technical Report UU-CS-2000-34, Utrecht University, Oct. 28, 2002, pp. 1-62.

Bouguet, "Requirements for benchmarking personal image retrieval systems", Intel Corporation, Proceedings SPIE, vol. 6061, Jan. 16, 2006, 12 pages.

Wu et al., "Sampling Strategies for Active Learning in Personal Photo Retrieval", IEEE International Conference on Multimedia and Expo, 2006, pp. 529-532.

METHODS AND APPARATUS FOR RETRIEVING IMAGES FROM A LARGE COLLECTION OF IMAGES

RELATED APPLICATION

This application is a continuation of U.S. patent application Ser. No. 11/604,114, filed on Nov. 22, 2006, now U.S. Pat. No. 7,840,076, which is herein incorporated by reference in its entirety.

FIELD OF THE INVENTION

The present disclosure relates generally to the field of data processing, and more particularly to methods and related apparatus for retrieving images from a large collection of digital images.

BACKGROUND

Over time, an individual may accumulate thousands of digital images in a personal computer. However, the larger the collection of images becomes, the more difficult it can be to find a desired digital image within the collection.

One approach to managing a large collection of images is to organize the images into folders named with relevant keywords. An individual may also give the images filenames that include relevant keywords. The keywords associated with an image may be referred to as user tags. The process of associating user tags with images may be a very time consuming, manual process. Consequently, many personal collections of digital images have relatively few, if any, user tags.

In addition, metadata may be used to organize or search collections of digital images. Metadata information is stored as part of the digital image, together with the pixel data. That is, the pixel data encodes the visual attributes of the images, such as hue and brightness, while the metadata encodes supplemental data, such the date and time the image was captured, the camera settings used to capture the image, etc.

Search techniques that use user tags and/or metadata may be referred to in general as tag based. Given the nature of many personal collections or databases of digital images, tag-based search techniques are often ineffective.

Another approach for retrieving or locating a desired image in a large collection of digital images is to use a content-based search technique.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

The present disclosure describes an example image searching system that uses content-based search techniques to locate images in a collection.

Figure 1:
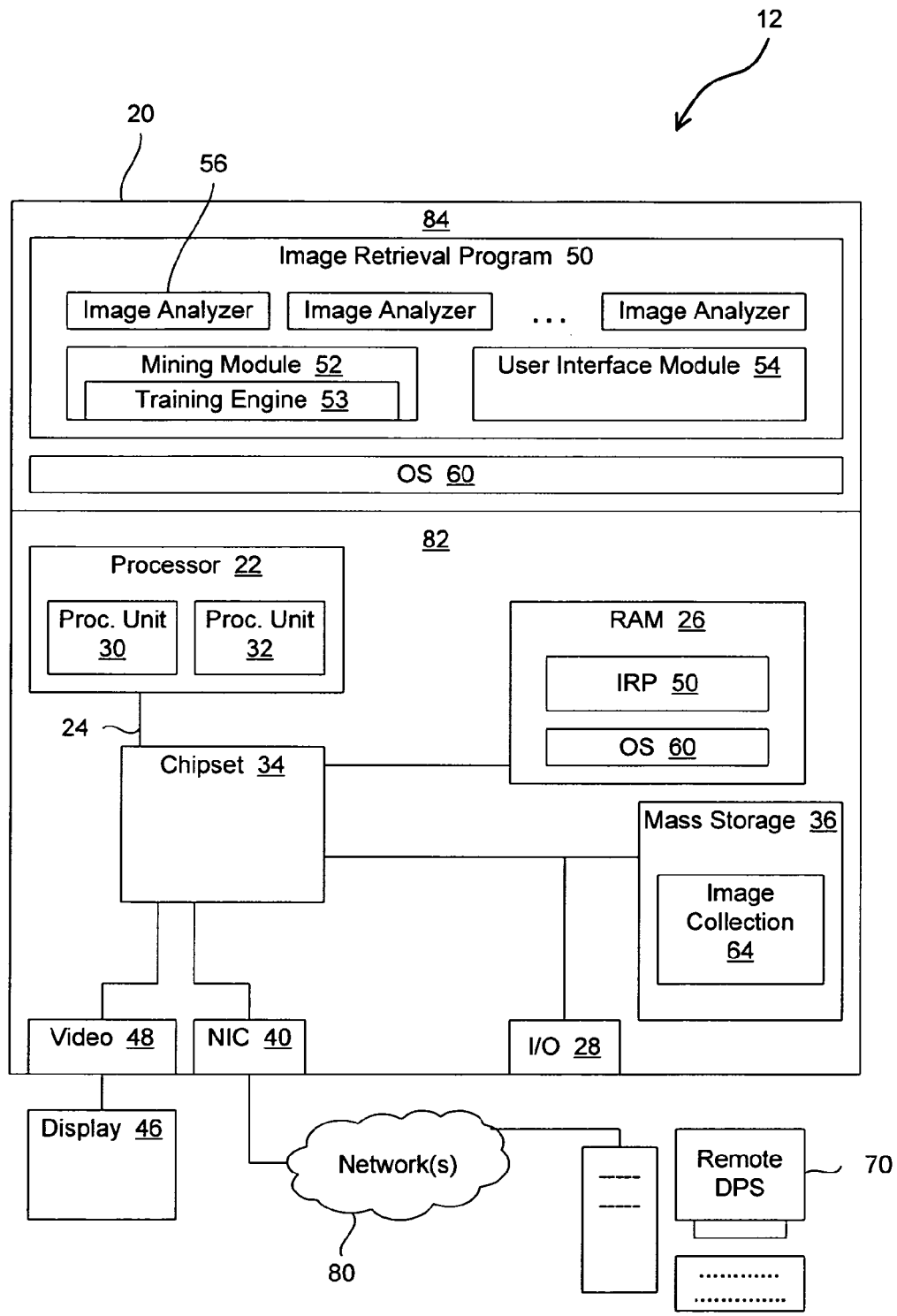
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that has various hardware components 82, such as a central processing unit (CPU) 22, communicatively coupled to various other components via one or more system buses 24 or other communication pathways or mediums. This disclosure uses the term "bus" to refer to shared communication pathways, as well as point-to-point pathways. CPU 22 may include two or more processing units, such as processing unit 30 and processing unit 32. Alternatively, a processing system may include a CPU with one processing unit, or multiple processors, each having at least one processing unit. The processing units may be implemented as processing cores, as Hyper-Threading (HT) technology, or as any other suitable technology for executing multiple threads simultaneously or substantially simultaneously.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Processing system 20 may be controlled, at least in part, by input from conventional input devices, such as a keyboard, a mouse, etc., and/or by directives received from another machine, biometric feedback, or other input sources or signals. Processing system 20 may utilize one or more connections to one or more remote data processing systems 70, such as through a network interface controller (NIC) 40, a modem, or other communication ports or couplings. Processing systems may be interconnected by way of a physical and/or logical network 80, such as a local area network (LAN), a wide area network (WAN), an intranet, the Internet, etc. Communications involving network 80 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available at grouper.ieee.org/groups/802/16/published.html.

Within processing system 20, processor 22 may be communicatively coupled to one or more volatile or non-volatile data storage devices, such as RAM 26, read-only memory (ROM), mass storage devices 36 such as hard drives, and/or other devices or media, such as floppy disks, optical storage, tapes, flash memory, memory sticks, digital video disks, etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as a video controller 48, integrated drive electronics (IDE) controllers, small computer system interface (SCSI) controllers, universal serial bus (USB) controllers, input/output (I/O) ports 28, input devices, output devices such as a display 46, etc.

Processor 22, RAM 26, and other components may be connected to a chipset 34. Chipset 34 may include one or more bridges or hubs for communicatively coupling system components, as well as other logic and storage components.

Some components, such as video controller 48 for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

The invention may be described herein with reference to data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations. The programs in processing system 20 may be considered components of a software environment 84.

For instance, software environment 84 may include an operating system (OS) 60 and an image retrieval program (IRP) 50, which processing system 20 may load into RAM 26 for execution. Processing system 20 may obtain OS 60 and IRP 50 from any suitable local or remote device or devices (e.g., from mass storage device 36 or from remote processing system 70). In an alternative embodiment, the IRP may be implemented as a remote application (e.g., a web service) executing on a remote server, to service users at client processing systems.

In the embodiment of FIG. 1, mass storage device 36 includes an image collection 64. As described in greater detail below, a user may utilize IRP 50 to retrieve desired images from image collection 64. IRP 50 may include a user interface module 54 for receiving input from the user and for presenting various user-selectable options, search results, etc. IRP 50 may include various different image analyzers 56 for extracting feature descriptors for various different modalities, such as color histogram, texture, etc. Each feature descriptor represents the attributes of an image, or the attributes of a portion of an image, from the perspective of a particular modality. IRP 50 may also include a mining module 52 for analyzing the feature descriptors for the images in image collection 64 and returning search results, in light of input data concerning the types of images desired by the user. Mining module 52 may include a training engine 53 for generating trained classifiers, as described in greater detail below.

Figure 2:
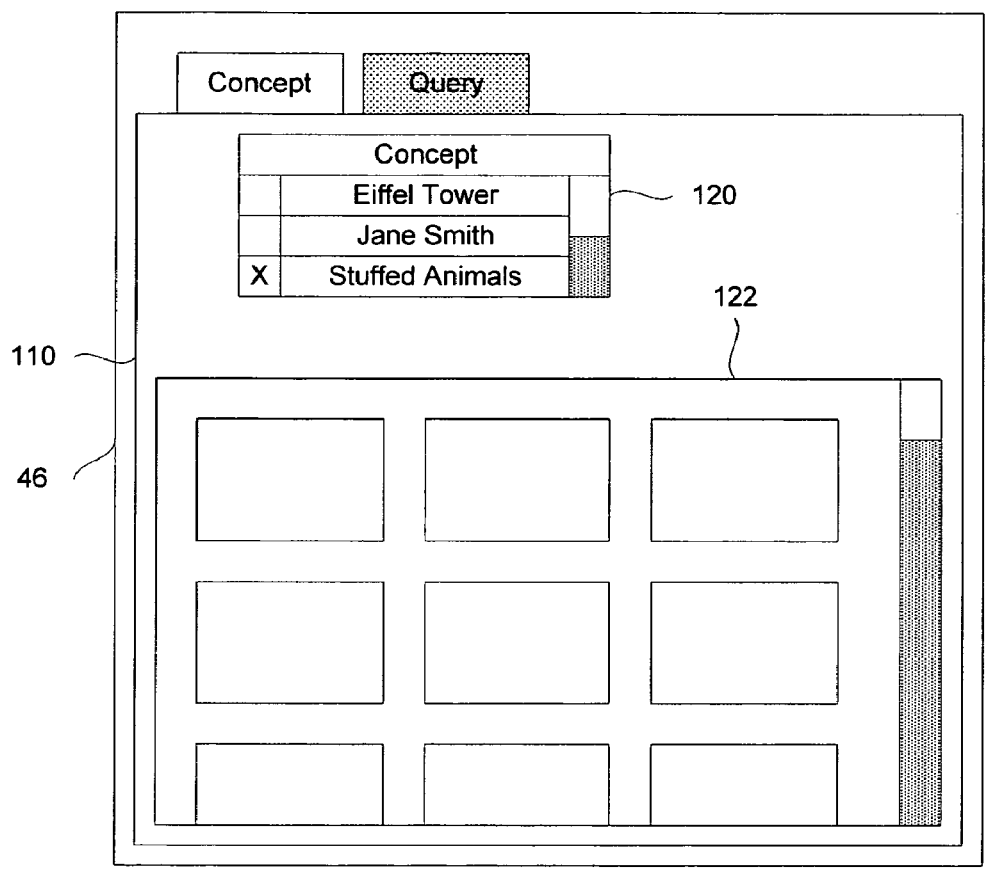
FIGS. 2 and 3 are schematic diagrams depicting user interfaces according to an example embodiment of the present invention.
Figure 3:
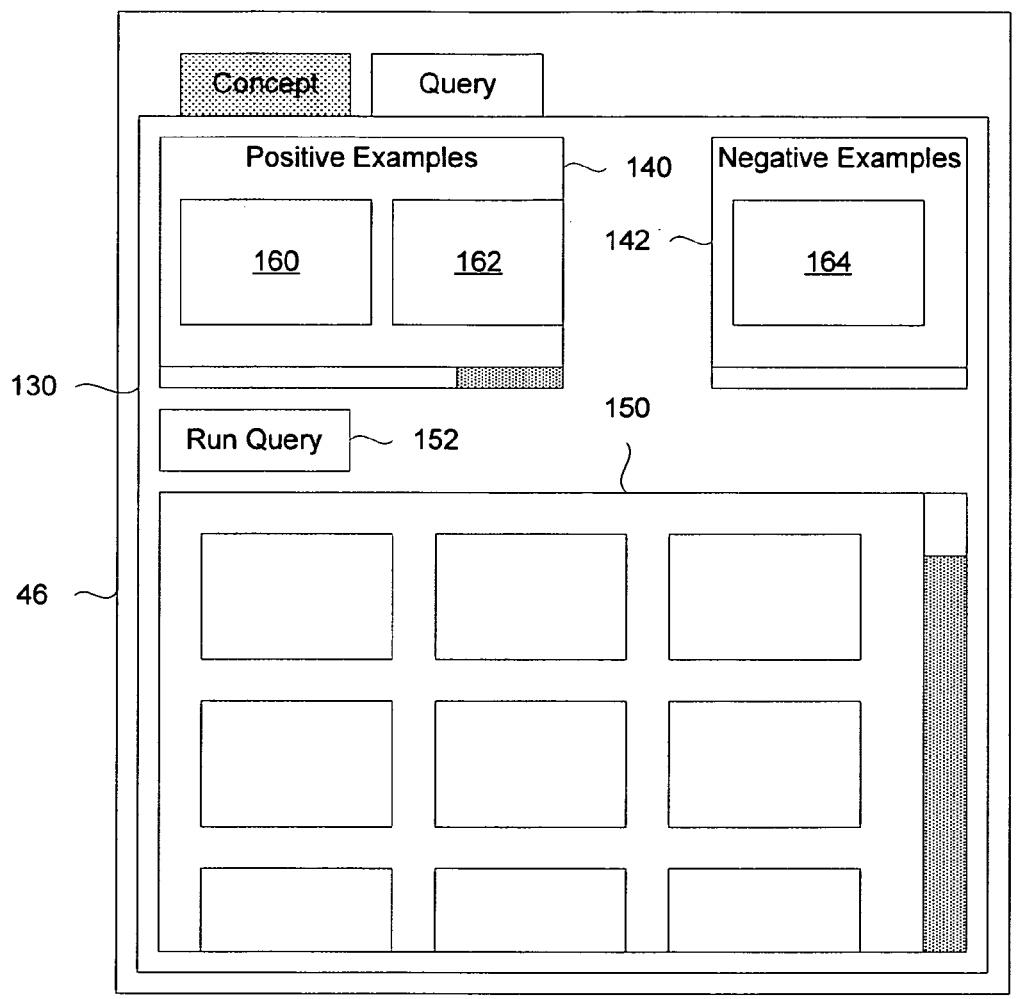

FIGS. 2 and 3 are schematic diagrams depicting example user interfaces presented by user interface module 54. FIGS. 2 and 3 show a concept window 110 and a query window 130, respectively, presented in display 46 by user interface module 54. Those windows include tabs labeled "concept" and "query." In FIG. 2, the query tab is filled with dots to indicate that the user can switch to the query window by selecting the query tab.

Concept window 110 allows a user to view predefined concept image sets and to select corresponding concept models. In particular, concept selection box 120 lists the names or labels of all of the predefined image concepts, and each row in concept selection box 120 includes a selection field for the user to select that concept, if desired. Concept selection box 120 may also include a scroll bar, for viewing different portions of the list.

When a user selects a concept, user interface module 54 may populate a result window 122 with thumbnail versions of the images belonging to the selected concept. For instance, if the user selects a "stuffed animals" concept, user interface module 54 may display images from image collection 64 that belong to the stuffed animals concept. In one embodiment, those images are displayed in ranked order, starting with the images that have highest relevance scores, with respect to the search formulas associated with the selected concept. If multiple concepts are selected, the relevance scores for all concepts may be combined to generate a relevance score or metric for each image. For instance, all of the relevance metrics for an image may be multiplied together. The resulting metric for each image may be used to sort the images according to the relevance to the several selected concepts.

A user may first generate a concept or concept model by using query window 130 to perform interactive relevance feedback searches, as described in greater detail below, until the cluster of images at the top of the ranked results matches what the user wants to find. The user may then use IRP 50 to save the result set and/or the underlying concept model as a concept. Alternatively, an online service may allow users to download predefined concepts models into IRP 50.

The user may select one or more predefined concepts from concept window 110, and then select the query tab to move to query window 130. Alternatively, the user may switch to query window 130 without selecting any concept. If a concept was selected, query window may start with the same thumbnails in the search result window 150 as were shown in search result window 122. If no concept was selected, the thumbnails from image collection 64 may be presented in a predefined default order (e.g., by date).

To run a relevance search, once at query window 130, the user may select one or more positive examples 160, 162 and zero or more negative examples 164. For instance, the user may click and drag images from result window 150 to positive example window 140 or negative example window 142 to indicate what kinds of pictures have or do not have the desired qualities, attributes, or contents. The user could then select a run query button 152, to cause mining module 52 to process image collection 64, according to the supplied example(s).

For example, if the user were trying to find pictures of Jane Smith playing tennis, the user could select the Jane Smith concept from concept window 110, switch to query window 130, scroll through the result window to find a picture of Jane Smith playing tennis, drag and drop that image into positive example window 140, and then select run query button 153. Mining module 52 could then figure out what kind of classifiers would be well suited for retrieving images that match the supplied positive example(s) and differ from any negative examples, and mining module 52 could use those classifiers to generate a new rank order. User interface module 54 may then display a result list in result window 150, in ranked order.

For purposes of this disclosure, a classifier or classification engine is a function or algorithm for mapping from a discrete or continuous feature space X to a discrete set of labels Y. For instance, a classifier may map from a feature set or similarity matrix for a candidate image to a relevance metric (e.g., a floating point number) that indicates how similar the candidate image is to a positive example image. Since classifiers are configured to generate relevance metrics for images, classifiers may be referred to as relevance metric generators. Also, since those relevance metrics can be ranked, a classifier may also be referred to as a ranking algorithm.

Feature descriptors for the images may be used to generate some or all of the relevance metrics. For purposes of this disclosure, a global feature descriptor is a metric or set of metrics that represents an image as a whole. By contrast, a local feature descriptor is a metric or set of metrics that represents a portion of an image, based on a division of that image into multiple regions or portions. Each global feature descriptor may be based on all or substantially all of the pixel values for an image, while each local feature descriptor may be based on the pixel values for a portion of an image.

In addition, mining module 52 may condense feature descriptors for each modality into a similarity matrix, such as a pair-wise kernel matrix. For example, each cell in a kernel matrix may provide a similarity metric measuring the similarity of two images, and each row in the kernel matrix may provide the similarity metrics for a given image, relative to all other images in the image collection. A similarity matrix may therefore be considered to be a collection of relative feature descriptors. Mining module 52 may use multiple similarity matrices and multiple classifiers to generate relevance metrics. In the example embodiment, mining module 52 uses machine learning methods to design the classifiers for each query.

As background, in a simple scenario involving a single modality (e.g., a global color histogram), the process of generating a classifier and using that classifier to rank images could go as follows:

The mining module generates a similarity matrix for the giving modality. The similarity matrix includes a similarity metric for each image, relative to each other image.

The feature descriptors of the training examples (i.e., the positive and negative examples) are received as input by a part of the mining module known as the training engine or module. The training engine also receives the similarity matrix.

The training engine uses machine learning techniques to determine an effective classifier, based on the feature descriptors for the training examples and the similarity matrix. For example, the training engine may produce a suitably configured nearest-neighbor classifier if only positive examples exist, or a suitably configured SVM classifier if positive and negative examples exist. The classifier that the training engine generates may be referred to as a trained classification engine.

The mining module then uses the trained classification engine to compute a relevance metric for each image in the database.

In a simple scenario where no other modalities are considered, the mining module uses those relevance metrics to generate the final output (e.g., an ordered list of thumbnail images).

However, in the example embodiment, mining module 52 typically uses multiple modalities to rank images. When multiple modalities are involved, training engine 53 may generate a separate classifier for each modality, and training engine 53 may also generate a fusion classifier to blend the results from the modality-specific classifiers. Training engine 53 may use relevance metrics from the modality-specific classifiers to determine an effective fusion classifier. The fusion classifier may be referred to as a final classifier, and the modality-specific classifiers may be referred to as intermediate classifiers.

Figure 4:
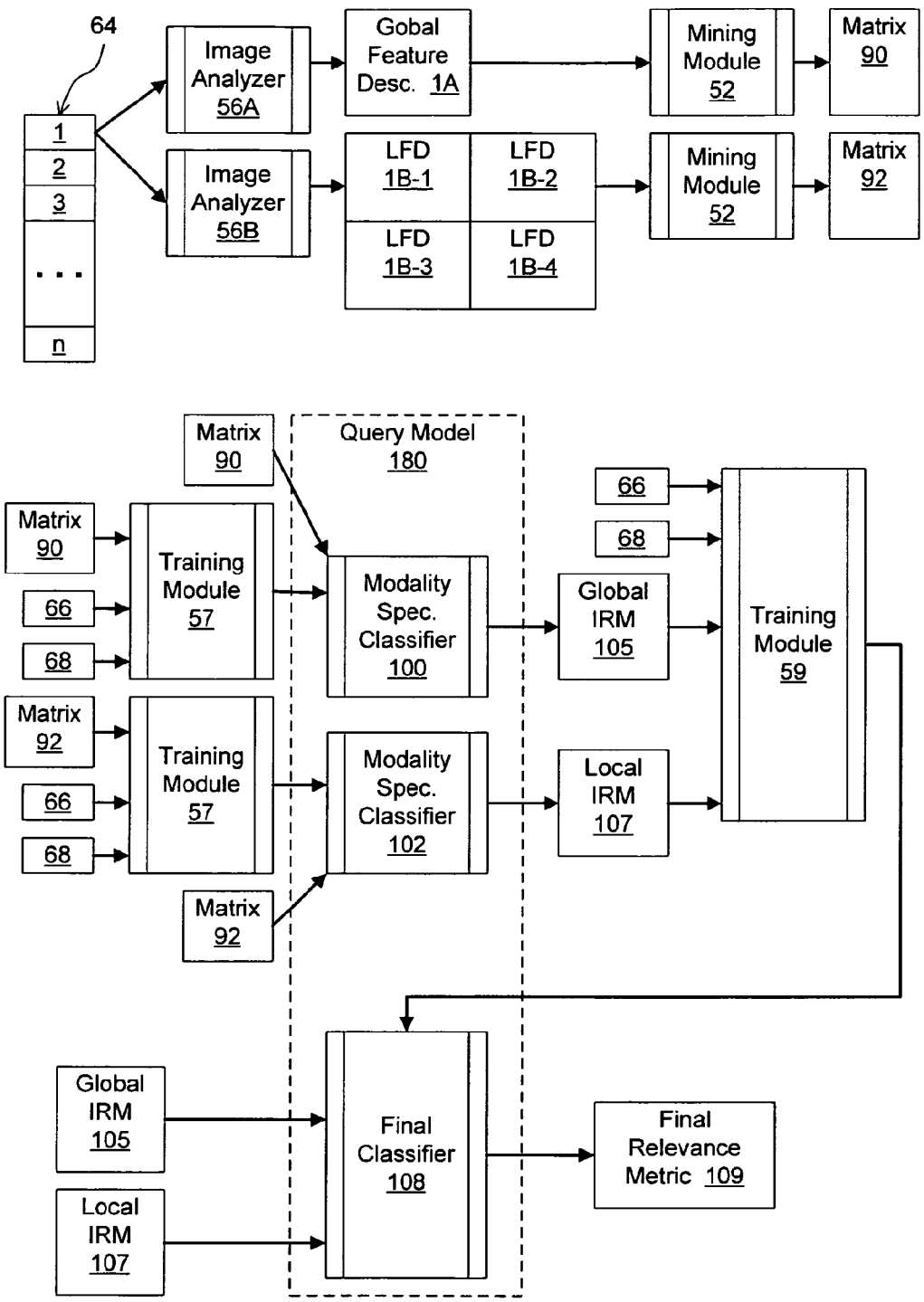
FIG. 4 depicts a flowchart of an example embodiment of a process for generating classifiers and ranked search results according to an example embodiment of the present invention.

FIG. 4 depicts a flowchart of an example embodiment of a process for generating classifiers and ranked search results. For instance, the illustrated process may begin in response to the user selecting run query button 152 after (a) selecting one or more concepts from concept window 110 and (b) selecting one or more positive examples and zero or more negative examples from query window 130. After run query button 152 is selected, IRP 50 may use two or more different image analyzers to analyze each image in image collection 64 with respect to different modalities. For instance, with regard to image 1, image analyzer 56A may extract a global feature descriptor 1A that represents a color histogram of image 1, while image analyzer 56B may extract local feature descriptors (LFDs) 1B-1, 1B-2, 1B-3, and 1B-4 that represent the texture characteristics of four different portions of image 1. IRP 50 may use this process to extract feature descriptors from the rest of the images in image collection 64 (e.g., image 2, image 3, . . . image n).

Although the process of FIG. 4 shows only two image analyzers for the sake of simplicity and clarity, in other embodiments two or more image analyzers may be used to generate global features descriptors for two or more different modalities, and the same type or different types of image analyzers may be used to generate local feature descriptors for useful modalities. Also, in addition to image analyzers for the modalities referenced above, image analyzers for many other modalities may be used, including, without limitation, face detectors, salient point detectors, and color correlograms.

Also, although mining module 52 divides each image into four local portions in the embodiment of FIG. 4, other embodiments may use other divisions, such as two, three, five, etc. Mining module 52 may also divide images asymmetrically. For instance, mining module 52 may use data driven segmentation to partition an image, based on the content of the image. For example, an area of uniform or substantially uniform color may be used as one portion.

In addition, in some embodiments, global and/or local feature descriptors may be saved for future queries once generated in a first query, or they may be generated and saved before they are needed for any queries, for instance when an image is first imported into the processing system.

In the process of FIG. 4, once local and global feature descriptors have been extracted from all of the images, mining module 52 may condense the global feature descriptors for all of the images into a global similarity matrix 90, and mining module 52 may condense the local feature descriptors for all of the images into a local similarity matrix 92. In one embodiment, when analyzing the local feature descriptors for an image, mining module 52 selects one image portion to be used in generating the local similarity matrix. For example, mining module 52 may determine which portion has the minimum distance from the example image or images, and use that portion to represent the entire image in local similarity matrix 92. In an alternative embodiment, the mining module may create multiple matrices for local feature descriptors, for instance with one matrix for each portion.

A training module 57 may then use machine learning to generate a trained classifier 100 for the global feature descriptors, based on global similarity matrix 90, feature descriptors 66 for one or more positive examples, and feature descriptors 68 for zero or more negative examples. Training module 57 may also generate a trained classifier 102 for the local feature descriptors, based on local similarity matrix 92 and feature descriptors 66, 68 for the positive and negative examples. In the example embodiment, image analyzer 56A and classifier 100 are configured to handle the same kind of modality (e.g., color histogram), while image analyzer 56B and classifier 102 are both configured to handle a different modality (e.g., texture). Classifiers 100 and 102 may be considered modality-specific classifiers because each is configured to generate relevance metrics for a particular modality.

Once training module 57 has generated classifiers 100 and 102, mining module 52 may use classifier 100 to generate a global intermediate relevance metric (IRM) 105 for each image, based on global similarity matrix 90. Mining module 52 may also use classifier 102 to generate a local intermediate relevance metric 107 for each image, based on local similarity matrix 92. Furthermore, in some situations, mining module 52 may use multiple modality-specific classifiers for local metrics and multiple modality-specific classifiers for global metrics.

In an alternative embodiment, a classifier for local feature descriptors may generate a local intermediate relevance metric for each different portion of the image.

In the example embodiment, the intermediate relevance metrics may be used to generate a final classifier 108, via machine learning. For instance, a training module 59 may use the global IRMs 105 and the local IRMs 107 for all of the images, as well as the feature descriptors 66, 68 for the positive and negative examples to generate final classifier 108. Training modules 57 and 59 may reside within the training engine 53 depicted in FIG. 1.

Final classifier 108 may then generate final relevance metrics 109 for all of the images, based on intermediate relevance metrics 105 and 107. IRP 50 may then use the final relevance metrics 109 to rank the images and display them as thumbnails in ranked order in result window 150.

The user may then provide additional feedback by adding images to or removing images from positive example window 140 and/or negative example window 142. The user may then run a new query, and the above process may be repeated, with training engine 53 using the new example images to train new classifiers, etc.

Thus, IRP 50 allows the user to utilize content-based retrieval techniques, where images are selected as query terms, to search and explore a collection of images. Mining module 52 may use visual features extracted from the images in the collection to detect images that are similar to positive example images and unlike negative examples, to create clusters of images that are nearly identical, called near duplicates. A content-based image search may be referred to as a relevance search.

In addition, once the user is satisfied with a cluster of near duplicates, the user may save the associated classifiers as a concept. The saved concepts may then be used in subsequent searches. When a user saves a concept, IRP 50 may actually save the visual concept model that was used to produce the results with which the user is satisfied. For purposes of this disclosure, a visual concept model is a set of two or more intermediate classifiers, as well as a final classifier for consolidating or blending the results from the intermediate classifiers to produce relevance metrics for images. As depicted in FIG. 4, a visual concept model may also be referred to as a query model 180.

When the user selects a saved concept from concept interface 110, IRP 50 may use the corresponding saved classifiers to rank the images in image collection 64 and display the ranked results in result window 122. Such a search may be considered a concept-based search.

The concept-based search results may then be used as the basis for a content-based relevance searches. For example, a user could be looking for beach images including a particular object such as a ball. With IRP 50, the user might select an existing "ball" concept model. The user might then use query interface 130 to select beach scenes that include a ball as positive examples and images with other types of backgrounds as negative images. IRP 50 could then analyze image collection 64 and give images with a ball on the beach the highest rankings. By contrast, a conventional system might be able to recognize images with a beach in the background, or images with a ball in the foreground, but conventional systems may be incapable of effectively recognizing images that have a ball in the foreground with a beach in the background.

In one embodiment, when the user selects example images and runs a query after selecting a concept, the IRP generates new classifiers based on the selected examples. In another embodiment, the IRP includes logic to remember the concept-based classifiers and to generate new classifiers to include a blend of classifiers based on the selected example images and the original classifiers. The mining module may then use the blended classifiers to rank the digital images in the collection.

A process like that depicted in FIG. 4 may also be used for searching one or more videos for desired content. For instance, image collection 64 may include videos, or videos may be stored and analyzed independently. In one embodiment, mining module 52 treats every nth frame of the video as a key frame, and may disregard the other frames. Alternatively, mining module 52 may average groups of frames into key frames. The search results may then include thumbnail images from multiple high-ranking key frames from the video, depending on the results of the ranking algorithms. IRP 50 may link each key frame to a corresponding section of the video from which that frame was obtained. IRP 50 may also allow the user to select videos or video key frames as positive or negative examples.

IRP 50 may be highly scalable for operation in processing systems with multiple processing cores. For instance, different threads may execute in parallel to generate feature descriptors for different images, to generate different types of feature descriptors for a single image, to generate relevance metrics for different images, etc.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method comprising:
   receiving an example image for use in querying a collection of digital images;
   using, by a processing system, a local feature descriptor representing a portion of the contents of a digital image and a global feature descriptor representing substantially all of the contents of the digital image to perform a content-based image comparison of the collection of digital images with the example image to automatically rank the collection of digital images with respect to similarity to the example image;
   using a final classifier and multiple different intermediate classifiers to perform the automatic ranking, comprising:
      generating, by the different intermediate classifiers, intermediate relevance metrics with respect to different modalities; and
      generating, by the final classifier, results from the intermediate classifiers into a final relevance metric to display images in ranked order;
   after generating the final relevance metric, receiving input identifying a second example image for use in querying the collection of digital images;
   automatically determining at least one new intermediate classifier, based at least in part on the example images;
   automatically determining a new final classifier, based at least in part on the example images; and
   using the new intermediate classifier and the new final classifier to automatically re-rank the digital images in the collection with respect to similarity to the example images;
   wherein the processing system comprises at least one a computer processor that the processing system uses to perform the content-based image comparison.

2. The method of claim 1, further comprising:
   receiving input that selects a predetermined concept which corresponds to a predetermined query model; and
   ranking the collection of digital images, with regard to the predetermined query model.

3. The method of claim 1, further comprising:
   computing first and second sets of feature descriptors for digital images in the collection, wherein the first set of feature descriptors summarizes digital images from the perspective of a first modality, and wherein the second set of feature descriptors summarizes digital images from the perspective of a second modality; and
   using the first and second sets of feature descriptors when performing the automatic ranking.

4. The method of claim 1, further comprising:
   presenting images from the collection in a user interface in a ranked order with respect to similarity to the example image, based on results of the ranking;
   after receiving input identifying the second example image, automatically generating a new classifier, based at least in part on the example images; and
   using the new classifier to automatically re-rank the collection of digital images with respect to similarity to the example images.

5. The method of claim 1, further comprising:
   computing the global feature descriptor for each digital image comprising a set of pixel values, based on substantially all of the pixel values of that digital image.

6. The method of claim 1, further comprising:
   computing multiple local feature descriptors for each digital image comprising a set of pixel values, the different local feature descriptors for each image based on the pixel values in different portions of that image.

7. The method of claim 1, further comprising:
   automatically computing at least one set of feature descriptors for the collection of digital images dynamically, after receiving the example image.

8. The method of claim 1, further comprising:
   computing at least one set of feature descriptors for collection of digital images; and
   saving the computed feature descriptors for future use.

9. The method of claim 1, wherein the operation of using feature descriptors to automatically rank the collection of digital images comprises:
   using at least one similarity matrix to automatically rank the digital images.

10. An apparatus comprising:
    a non-transitory machine-accessible medium; and
    instructions in the non-transitory machine-accessible medium, wherein the instructions, when executed by a processing system, cause the processing system to perform operations comprising:
    receiving an example image for use in querying a collection of digital images;
    using a local feature descriptor representing a portion of the contents of a digital image and a global feature descriptor representing substantially all of the contents of the digital image to perform a content-based image comparison of the collection of digital images with the example image to automatically rank the collection of digital images with respect to similarity to the example image;
    using a final classifier and multiple different intermediate classifiers to perform the automatic ranking, comprising:
       generating, by the different intermediate classifiers, intermediate relevance metrics with respect to different modalities; and
       generating, by the final classifier, results from the intermediate classifiers into a final relevance metric to display images in ranked order;

after generating the final relevance metric, receiving input identifying a second example image for use in querying the collection of digital images;

automatically determining at least one new intermediate classifier, based at least in part on the example images;

automatically determining a new final classifier, based at least in part on the example images; and using the new intermediate classifier and the new final classifier to automatically re-rank the digital images in the collection with respect to similarity to the example images.

11. The apparatus of claim 10, wherein the instructions cause the processing system to perform operations comprising:

receiving input that selects a predetermined concept which corresponds to a predetermined query model; and ranking the collection of digital images, with regard to the predetermined query model.

12. The apparatus of claim 10, wherein the instructions cause the processing system to perform operations comprising:

computing first and second sets of feature descriptors for digital images in the collection, wherein the first set of feature descriptors summarizes digital images from the perspective of a first modality, and wherein the second set of feature descriptors summarizes digital images from the perspective of a second modality; and using the first and second sets of feature descriptors when performing the automatic ranking.

13. The apparatus of claim 10, wherein each digital image comprises a set of pixel values, and the instructions cause the processing system to perform operations comprising:

computing multiple local feature descriptors for each digital image, the different local feature descriptors for each image based on the pixel values in different portions of that image.

14. The apparatus of claim 10, wherein the instructions cause the processing system to perform operations comprising:

using at least one similarity matrix to automatically rank the digital images.

15. The apparatus of claim 10, wherein the instructions cause the processing system to perform operations comprising:

presenting images from the collection in a user interface in a ranked order with respect to similarity to the example image, based on results of the ranking;

after receiving input identifying the second example image, automatically generating a new classifier, based at least in part on the example images; and using the new classifier to automatically re-rank the collection of digital images with respect to similarity to the example images.

16. The apparatus of claim 10, wherein the instructions cause the processing system to perform operations comprising:

computing the global feature descriptor for each digital image comprising a set of pixel values, based on substantially all of the pixel values of that digital image.

17. The apparatus of claim 10, wherein the instructions cause the processing system to perform operations comprising:

computing at least one set of feature descriptors for collection of digital images; and saving the computed feature descriptors for future use.

18. The apparatus of claim 10, wherein the operation of using feature descriptors to automatically rank the collection of digital images comprises:

using at least one similarity matrix to automatically rank the digital images.

* * * * *